G. A. BRYAN.
WATER LEVEL INDICATOR FOR STEAM BOILERS.
APPLICATION FILED FEB. 5, 1918.
1,288,377.
Patented Dec. 17, 1918.
2 SHEETS—SHEET 1.
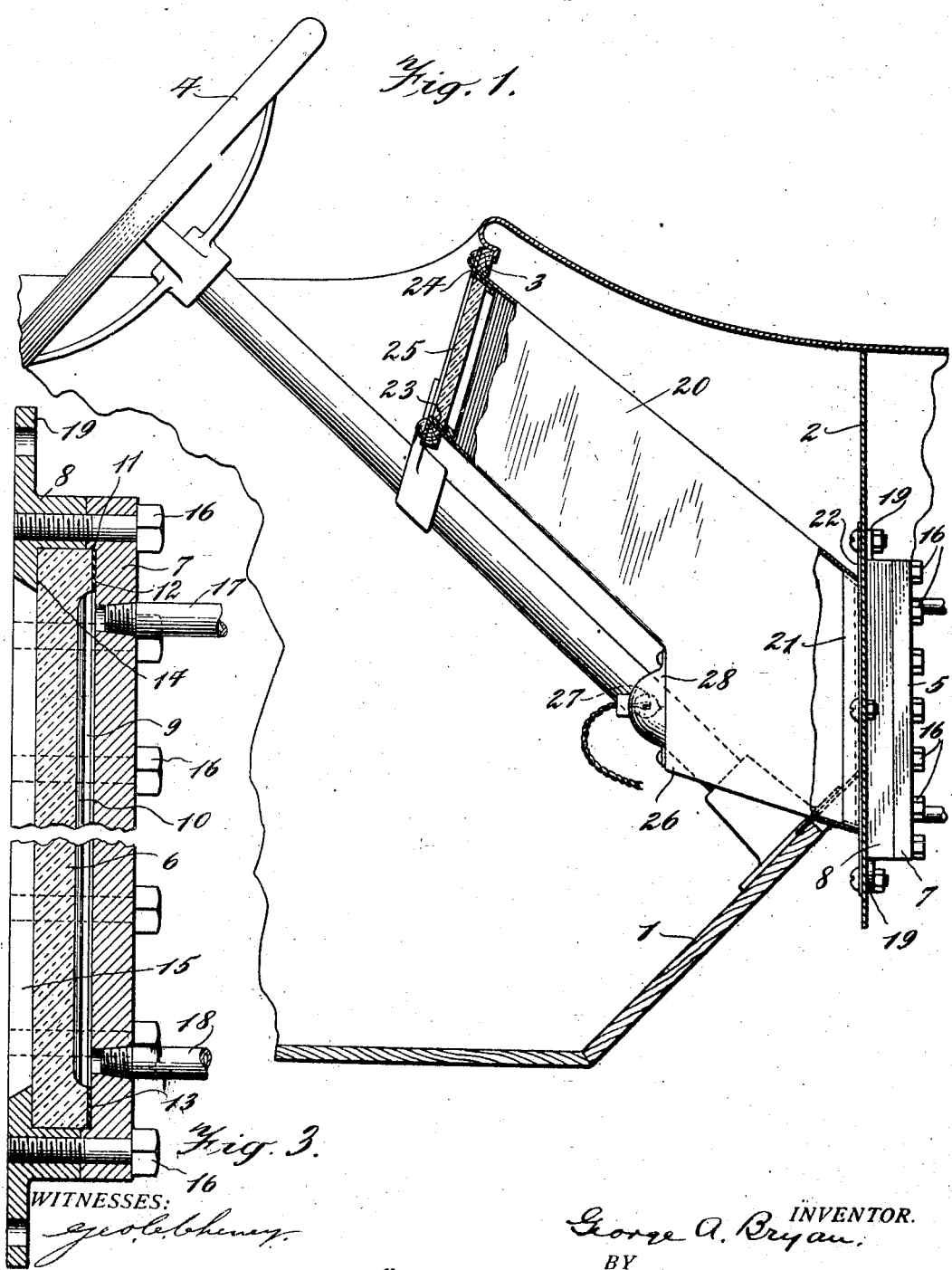
INVENTOR.
George A. Bryan.
BY
Rosenbaum, Stockbridge & Borst
ATTORNEYS.

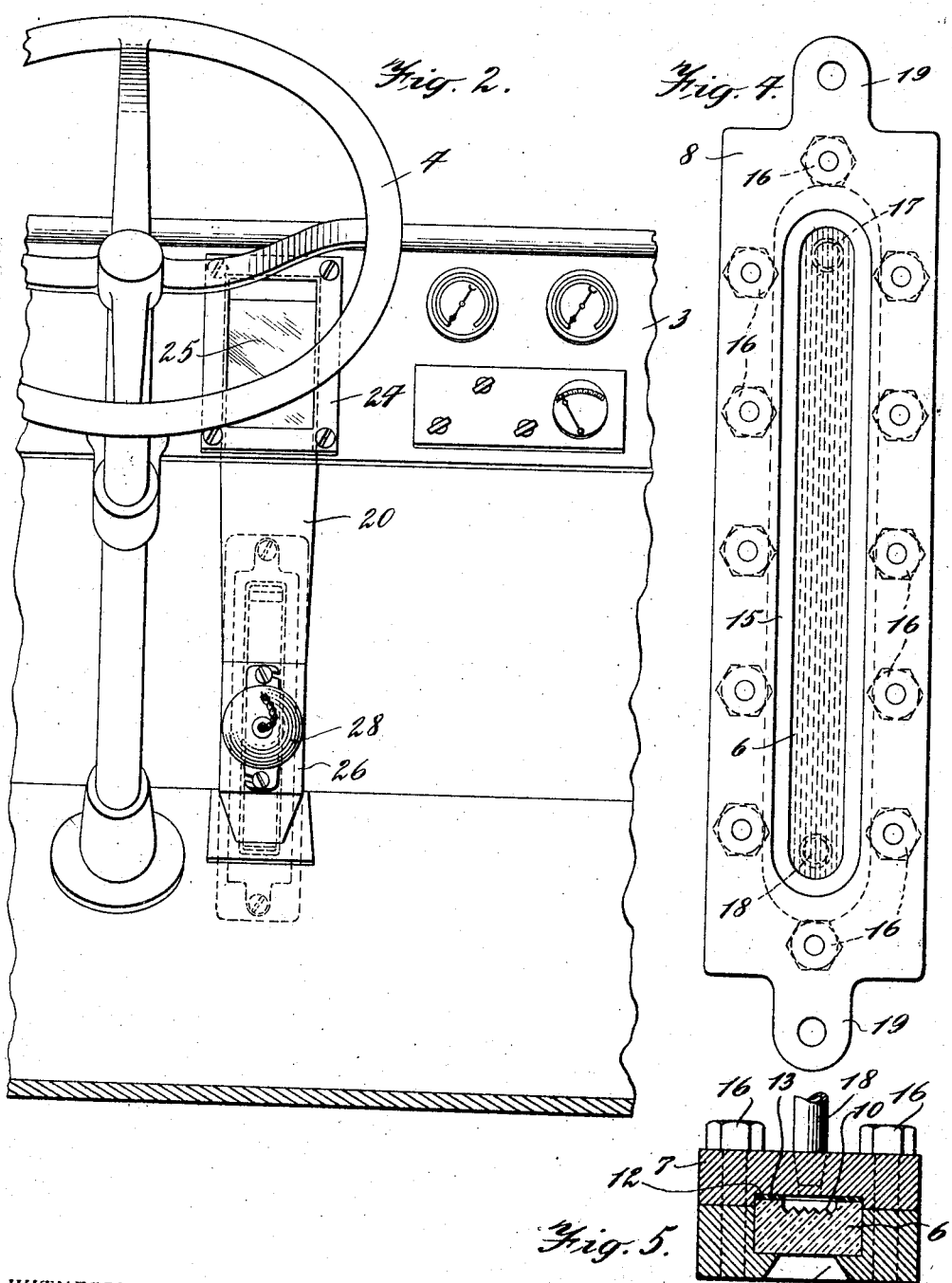

UNITED STATES PATENT OFFICE.

GEORGE A. BRYAN, OF ALBUQUERQUE, NEW MEXICO.

WATER-LEVEL INDICATOR FOR STEAM-BOILERS.

1,288,377.  Specification of Letters Patent.  Patented Dec. 17, 1918.

Application filed February 5, 1918. Serial No. 215,436.

*To all whom it may concern:*

Be it known that I, GEORGE A. BRYAN, a citizen of the United States, residing at Albuquerque, in the county of Bernalillo and State of New Mexico, have invented certain new and useful Improvements in Water-Level Indicators for Steam-Boilers, of which the following is a full, clear, and exact description.

My invention relates to water-level indicators for steam boilers, the same being particularly adapted for use on steam automobiles where it is important that the level of the water in the boiler may at all times be readily indicated to the driver. As gages or indicators for steam boilers must be located substantially on a level with the boiler itself, it can readily be understood that in a steam automobile such gage or indicator is necessarily disposed at a considerable distance from the driver. According to my invention, the normal location of such gage or indicator remains unchanged, but means are provided whereby a reading of the same may be made at the usual instrument board.

The details of the invention will hereinafter appear and the novel features thereof will be set forth in the claims.

In the drawings forming part of this specification

Figure 1 is a sectional side elevation of the forward end of the body of an automobile, showing an application of my invention thereto;

Fig. 2 is an elevation of the same at right angles to Fig. 1;

Fig. 3 is a vertical central sectional view of the water level indicator, shown detached from the dashboard of the automobile;

Fig. 4 is a front elevation, and

Fig. 5 is a cross section of the same.

Like reference numerals indicate like parts in the different views.

The floor 1, dashboard 2, instrument board 3, and steering wheel 4 of the automobile may be of any usual or preferred construction. The dashboard 2 is vertically disposed and has secured to one side thereof the water-level indicator or gage 5, the location of the latter corresponding in level with that of the boiler of the automobile.

The indicator 5 is made up of a solid gage glass 6 and a two-part metallic frame, within which the glass is inclosed and held, said frame comprising the rear member or casting 7 and the front member or casting 8. The glass 6 has a flat front face, is vertically elongated in shape and is recessed on its rear face, as shown at 9, the recess corresponding in shape with that of the glass itself and forming, when the parts of the device are assembled, a shallow and narrow passage or chamber for the reception of the water and steam from the boiler. The vertical front wall of the recess 9 is preferably corrugated or faceted, as shown at 10, for a purpose which will hereinafter appear. The recess 9 produces an elongated hollow or annular bearing surface 11 around the rear face of the gage glass, which bearing surface is flat throughout and parallel to the front surface of the glass. The front surface of the member 7 of the two-part metallic frame within which the gage glass 6 is held, is recessed as shown at 12, to receive said glass, and located between the annular bearing surface 11 and the member 7 of the said frame is an annular gasket 13 corresponding in shape and dimensions with said bearing surface. That portion of the front surface of the member 7 which is surrounded by the gasket 13 and lies opposite the corrugated or faceted recessed portion 9 of the gage glass 6, is nickel-plated or otherwise polished, so that it constitutes a reflecting surface. The member 8 of the two-part frame is rabbeted, as shown at 14, to receive the gage glass and is also provided with an elongated opening 15 corresponding in shape with, but of slightly smaller dimensions than, the glass 6, so that the front surface of the glass 6 is exposed to view. The edges of the opening 15 are preferably beveled, as shown. With the gage glass 6 and the gasket 13 located between the two members 7 and 8 of the metallic frame, as shown in Figs. 3 and 5 of the drawings, all the parts are firmly clamped together by the screws 16, with sufficient force to compress the gasket 13 and thereby produce a hermetic seal between the glass 6 and the member 7 of the frame.

The improved gage or indicator thus produced is strong and durable and capable of withstanding the pressures to which it will be subjected when used in connection with a high pressure boiler. Strength is imparted by the thickness of the mass of the glass 6, and the narrowness and shallowness of the recess 9 reduces the cross sectional area of the passage or chamber in the indicator and thereby reduces the effective area upon which the steam pressure may act. The passage formed by the recess 9 and the member 7 of the frame is connected to the steam boiler above and below by the pipes 17, 18, the pipe 17 serving to convey steam from the boiler and the pipe 18, water. These pipes are tapped into openings in the member 7 and communicate with the passage 9 at points appreciably removed from the ends of said passage, the purpose of this location being to prevent the extreme ends of the gage glass 6 from being subjected to sudden changes in temperature, which would tend to crack or break the same. It will be understood, of course, that the level of the water in the passage 9 of the indicator will correspond with the level in the boiler, and that with the polished or nickeled reflecting surface on the rear side of the casting 7, this level is readily visible by reason of the fact that the light reflected through the steam will be free and unobstructed. The member 8 of the indicator frame is provided with lugs or ears 19, by means of which the device may be bolted to the dashboard 2.

In connection with the parts described, I employ a sight tube 20, which extends from the instrument board 3 down to the dash 2 adjacent the indicator 5. The lower end of the sight tube surrounds the opening 15 in the frame of the indicator and is supported upon an annular flange 21 on a plate 22, screwed or otherwise secured to the dashboard. The upper end of the sight tube surrounds and is supported by an annular flange 23 on the plate 24, secured to the instrument board 3. And the upper end of said tube is closed by a plate of glass 25, which fits within the flange 23. The tube 20 is provided with an offset 26 directly in front of the gage or indicator 5, and in this offset is an opening through which the light from an electric lamp 27 passes. This lamp is provided with a reflector 28, which is screwed or otherwise secured to the tube 20 around the opening therein, so that the light from the lamp 27 is projected against the exposed portion of the glass 6 of the indicator 5. By this lamp and its reflector the gage glass of the indicator is illuminated and the light therefrom reflected upwardly through the tube 20 to a point adjacent the driver. The light passing through the gage glass and striking upon the reflecting surface at the rear thereof is reflected back through the water and steam in said glass, and due to the difference in the transparency of the water and steam within the indicator, makes the line of division between the water and the steam, or the water level, show up conspicuously, so that it may be observed by a mere glance on the part of the driver down through the tube 20. The water will appear black or dark, whereas the portion occupied by the steam will appear bright and shiny. The corrugations 10 in the recess 9 act as prisms to refract the light, so that direct blinding rays are not projected up into the driver's eyes.

While I have described my invention in connection with a steam automobile, it is capable of use in other connections and I do not wish to confine myself to any particular use, nor do I wish to restrict myself to any of the details of construction shown and described, except as I have done so in the appended claims.

I claim:

1. The combination with the dashboard and instrument board of a steam automobile, of a boiler water level indicator mounted on the dashboard and having a reflecting surface behind the gage glass thereof, a sight tube leading from the indicator to the instrument board, and means in said tube for illuminating the indicator.

2. The combination with the dashboard and instrument board of a steam automobile, of a boiler water level indicator mounted on the dashboard and having a reflecting surface behind the gage glass thereof, a sight tube secured at its lower end to the dashboard, leading from the indicator to the instrument board and secured at its upper end to the latter, and means in said tube for illuminating the indicator.

3. The combination with the dashboard and instrument board of a steam automobile, of a boiler water level indicator mounted on the dashboard and having a reflecting surface behind the gage glass thereof, a sight tube secured at its lower end to the dashboard, leading from the indicator to the instrument board, secured at its upper end to the latter and having an offset portion therein, a lamp mounted in said offset portion, and a reflector for projecting the light from the lamp upon the indicator.

4. The combination with the dashboard and instrument board of a steam automobile, of a boiler water level indicator mounted on the dashboard and having a reflecting surface behind the gage glass thereof, a plate secured to the dashboard in front of the indicator and having an annular flange thereon, a plate secured to the instrument board and having an annular flange thereon, the flanges on said plates extending toward each other, a sight tube leading from the indicator to the instrument board and supported by said flanges, and means in said tube for illuminating the indicator.

In witness whereof, I subscribe my signature, in the presence of two witnesses.

GEORGE A. BRYAN.

Witnesses:
ESTELLE HARRIS,
M. E. HICKEY.